(12) United States Patent
Tsunoya et al.

(10) Patent No.: US 11,426,796 B2
(45) Date of Patent: Aug. 30, 2022

(54) METAL SHAPED ARTICLE PRODUCTION METHOD

(71) Applicant: Seiko Epson Corporation, Tokyo (JP)

(72) Inventors: Akihiko Tsunoya, Okaya (JP); Toshimitsu Hirai, Hokuto (JP)

(73) Assignee: Seiko Epson Corporation

( * ) Notice: Subject to any disclaimer, the term of this patent is extended or adjusted under 35 U.S.C. 154(b) by 568 days.

(21) Appl. No.: 16/536,410

(22) Filed: Aug. 9, 2019

(65) Prior Publication Data

US 2020/0047249 A1 Feb. 13, 2020

(30) Foreign Application Priority Data

Aug. 10, 2018 (JP) .............................. JP2018-151819

(51) Int. Cl.
| | | |
|---|---|---|
| *B22F 10/10* | (2021.01) | |
| *B33Y 10/00* | (2015.01) | |
| *B33Y 30/00* | (2015.01) | |
| *B33Y 50/02* | (2015.01) | |
| *B29C 64/40* | (2017.01) | |
| *B29C 64/188* | (2017.01) | |
| *B29C 64/20* | (2017.01) | |
| *B29C 64/393* | (2017.01) | |
| *B29C 64/141* | (2017.01) | |
| *B29K 505/00* | (2006.01) | |

(52) U.S. Cl.
CPC .............. *B22F 10/10* (2021.01); *B29C 64/141* (2017.08); *B29C 64/188* (2017.08); *B29C 64/20* (2017.08); *B29C 64/393* (2017.08); *B29C 64/40* (2017.08); *B33Y 10/00* (2014.12); *B33Y 30/00* (2014.12); *B33Y 50/02* (2014.12); *B29K 2505/00* (2013.01)

(58) Field of Classification Search
None
See application file for complete search history.

(56) References Cited

U.S. PATENT DOCUMENTS

| | | | |
|---|---|---|---|
| 5,207,371 | A | 5/1993 | Prinz et al. |
| 2017/0106589 | A1 | 4/2017 | Ishida et al. |

FOREIGN PATENT DOCUMENTS

| | | | |
|---|---|---|---|
| JP | H05-192767 | A | 8/1993 |
| JP | 2007-021705 | A | 2/2007 |
| JP | 2007-098822 | A | 4/2007 |
| JP | 2017-075361 | A | 4/2017 |
| JP | 2018-020547 | A | 2/2018 |

*Primary Examiner* — Colin W. Slifka
(74) *Attorney, Agent, or Firm* — Harness, Dickey & Pierce, P.L.C.

(57) ABSTRACT

A metal shaped article production method includes a shaping data input step, a step of forming a constituent material layer using a constituent material, a step of forming a support material layer using a support material, a step of cutting a cut face in the constituent material layer of a stacked body formed by performing the constituent material layer forming step and the support material layer forming step, a step of degreasing a thermoplastic resin contained in the stacked body for which the cut face cutting step was performed, and a step of sintering metal particles by heating the stacked body, wherein in the support material layer forming step, the support material layer is formed so that a support face comes into contact with a face to be supported at an opposite side to the cut face at a position of the constituent material layer based on the shaping data.

5 Claims, 8 Drawing Sheets

METAL SHAPED ARTICLE PRODUCTION METHOD

The present application is based on, and claims priority from, JP Application Serial Number 2018-151819, filed Aug. 10, 2018, the disclosure of which is hereby incorporated by reference herein in its entirety.

BACKGROUND

1. Technical Field

The present disclosure relates to a metal shaped article production method.

2. Related Art

Heretofore, various three-dimensional shaped article production methods have been used. Among these, there is a three-dimensional shaped article production method for producing a three-dimensional shaped article using a constituent material constituting the three-dimensional shaped article and a support material supporting the constituent material by cutting the three-dimensional shaped article during production.

For example, JP-A-2007-21705 (Patent Document 1) discloses a three-dimensional shaped article production method for producing a three-dimensional shaped article using a photocurable resin constituting the three-dimensional shaped article and an auxiliary material supporting the photocurable resin by cutting the three-dimensional shaped article during production.

In the three-dimensional shaped article production method in the related art for producing a three-dimensional shaped article using a constituent material and an auxiliary material as disclosed in Patent Document 1, the three-dimensional shaped article or the auxiliary material is generally cut for adjusting the shape of the three-dimensional shaped article. However, when a material to be used is a metal, the material is hard and it is difficult to perform cutting processing. In view of this, when a metal shaped article is produced by subjecting a shaped body obtained by shaping a mixed material containing metal particles and a binder resin to degreasing and sintering steps, by cutting the shaped body produced from the mixed material before metalizing the shaped body, load involved in cutting is reduced. However, when the metal shaped article before being degreased and sintered is cut, the metal shaped article during cutting is sometimes deformed accompanying the cutting.

SUMMARY

A metal shaped article production method according to an aspect of the present disclosure is a metal shaped article production method for producing a metal shaped article based on shaping data including a shaping data input step of inputting the shaping data, a constituent material layer forming step of forming a constituent material layer using a constituent material containing metal particles constituting the metal shaped article and a thermoplastic resin, a support material layer forming step of forming a support material layer supporting the constituent material layer using a support material containing ceramic particles and a thermoplastic resin, a cut face cutting step of cutting a cut face in the constituent material layer of a stacked body formed by performing the constituent material layer forming step and the support material layer forming step, a degreasing step of degreasing the thermoplastic resin contained in the stacked body for which the cut face cutting step was performed, and a sintering step of sintering the metal particles by heating the stacked body, wherein in the support material layer forming step, the support material layer is formed so that a support face comes into contact with a face to be supported at an opposite side to the cut face at a position of the constituent material layer based on the shaping data.

DESCRIPTION OF EXEMPLARY EMBODIMENTS

Figure 1:
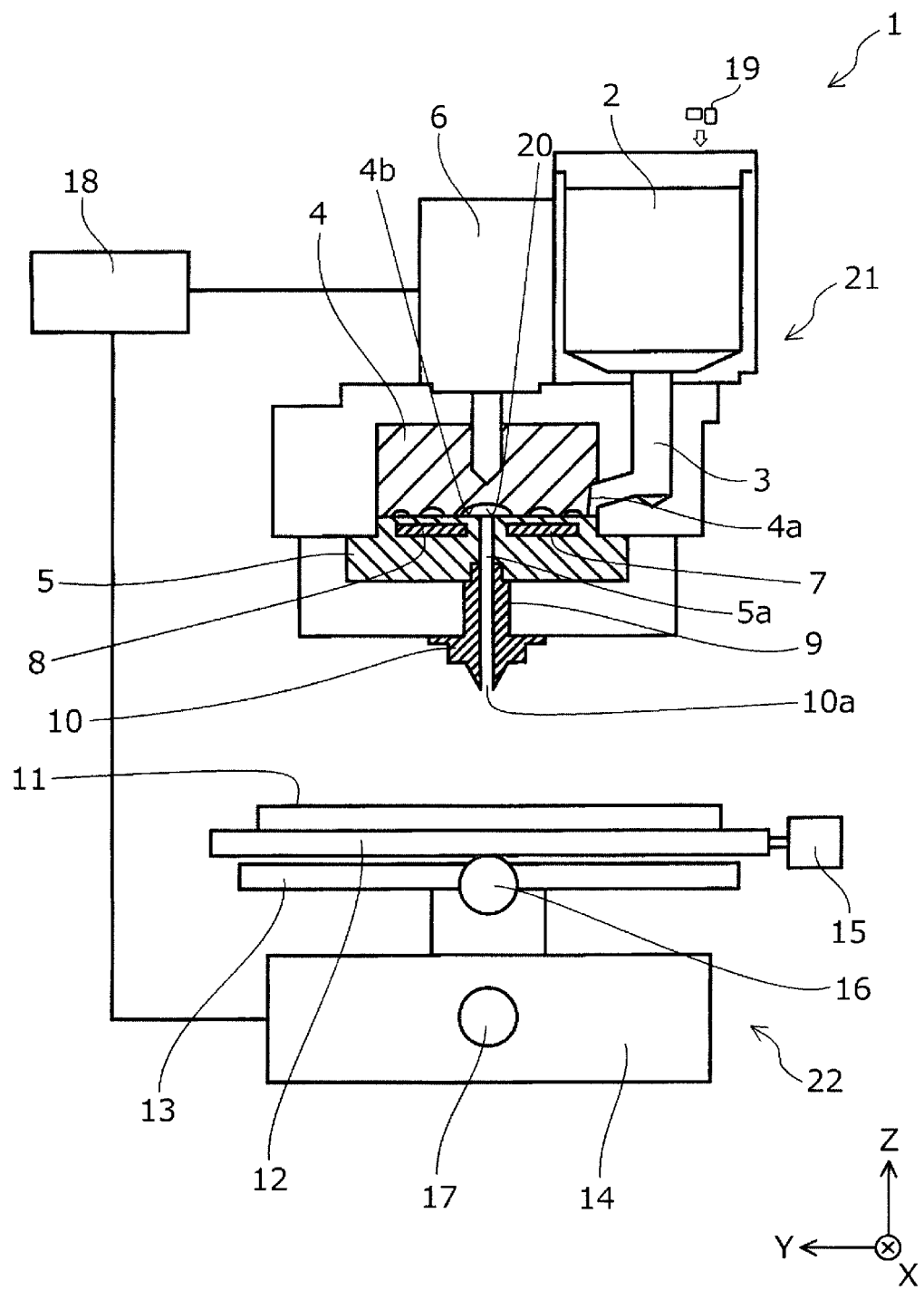
FIG. 1 is a schematic structural view showing a structure of a metal shaped article production apparatus according to one embodiment of the present disclosure.

First, the present disclosure will be schematically described.

A metal shaped article production method of a first aspect of the present disclosure for solving the above-mentioned problem is a metal shaped article production method for producing a metal shaped article based on shaping data including a shaping data input step of inputting the shaping data, a constituent material layer forming step of forming a constituent material layer using a constituent material containing metal particles constituting the metal shaped article and a thermoplastic resin, a support material layer forming step of forming a support material layer supporting the constituent material layer using a support material containing ceramic particles and a thermoplastic resin, a cut face cutting step of cutting a cut face in the constituent material layer of a stacked body formed by performing the constituent material layer forming step and the support material layer forming step, a degreasing step of degreasing the thermoplastic resin contained in the stacked body for which the cut face cutting step was performed, and a sintering step of sintering the metal particles by heating the stacked body, wherein in the support material layer forming step, the support material layer is formed so that a support face comes into contact with a face to be supported at an opposite side to the cut face at a position of the constituent material layer based on the shaping data.

According to this aspect, cutting of the cut face is performed before degreasing and sintering, however, the position of the constituent material layer assumed to be deformed accompanying the cutting of the cut face when there is no support by, for example, the support material layer based on the shaping data is in a state of being supported by the support material layer, and therefore, deformation of the metal shaped article accompanying the cutting of the cut face can be suppressed.

In the metal shaped article production method of a second aspect of the present disclosure, in the first aspect, the constituent material layer forming step is performed after performing the support material layer forming step, and a support material cutting step of cutting the support face supporting the face to be supported is performed after performing the support material layer forming step and before performing the constituent material layer forming step.

According to this aspect, the shape is adjusted by cutting the support face of the support material layer after forming the support material layer and before forming the constituent material layer, whereby the face to be supported of the constituent material layer to be supported by the support face can be highly accurately formed.

In the metal shaped article production method according to a third aspect of the present disclosure, in the first or second aspect, the cut face and the face to be supported face a direction crossing a stacking direction of the stacked body, and in the support material layer forming step, the support material layer is also formed at a position supporting a stacking direction face facing the stacking direction in the constituent material layer in addition to a position supporting the face to be supported.

According to this aspect, the support material layer is also formed at a position supporting a stacking direction face in addition to a position supporting the face to be supported. Therefore, not only deformation of the constituent material layer at the face to be supported side accompanying the cutting of the cut face can be suppressed, but also deformation of the constituent material layer at the stacking direction face side can be suppressed.

In the metal shaped article production method according to a fourth aspect of the present disclosure, in the third aspect, a removing step of removing the support material layer supporting the stacking direction face in the stacked body for which the cut face cutting step was performed, and a stacking direction face cutting step of cutting the stacking direction face in the stacked body for which the removing step was performed are included, and the degreasing step is performed after performing the stacking direction face cutting step.

According to this aspect, not only the cut face of the constituent material layer, but also the stacking direction face is cut, and therefore, not only the cut face, but also the stacking direction face can be highly accurately formed.

In the metal shaped article production method according to a fifth aspect of the present disclosure, in any one of the first to fourth aspects, a thickness adjusting step of adjusting a thickness of the support material layer in a direction crossing the support face by cutting the support material layer is performed before performing the degreasing step.

It takes a long time to perform degreasing when the thick support material layer is in contact with the constituent material layer, however, according to this aspect, the thickness of the support material layer in a direction crossing the support face is adjusted by cutting the support material layer before performing degreasing, and therefore, the degreasing time can be reduced.

Hereinafter, embodiments according to the present disclosure will be described with reference to the accompanying drawings.

First, an outline of a metal shaped article production apparatus 1 according to one embodiment of the present disclosure will be described with reference to FIGS. 1 to 4.

Here, in the drawings, X direction is a horizontal direction, Y direction is a horizontal direction and also a direction orthogonal to the X direction, and Z direction is a vertical direction.

The "metal shaped article" as used herein refers to a three-dimensional shaped article made of a metal. Further, the "three-dimensional shaping" as used herein refers to formation of a so-called "three-dimensional shaped article", and also includes, for example, formation of a planar plate shape, for example, a shape with a thickness even if the shape is a so-called two-dimensional shape like a shape constituted by a layer for one layer. Further, the "supporting" is meant to include not only a case of supporting from a lower side, but also a case of supporting from a lateral side, and in some cases, a case of supporting from an upper side.

As shown in FIG. 1, the metal shaped article production apparatus 1 of this embodiment includes a hopper 2 housing a pellet 19 as a constituent material containing metal particles constituting a metal shaped article and a thermoplastic resin. The pellet 19 housed in the hopper 2 is supplied, through a supply tube 3, to a circumferential face 4a of a flat screw 4 with a substantially cylindrical shape.

Figure 2:
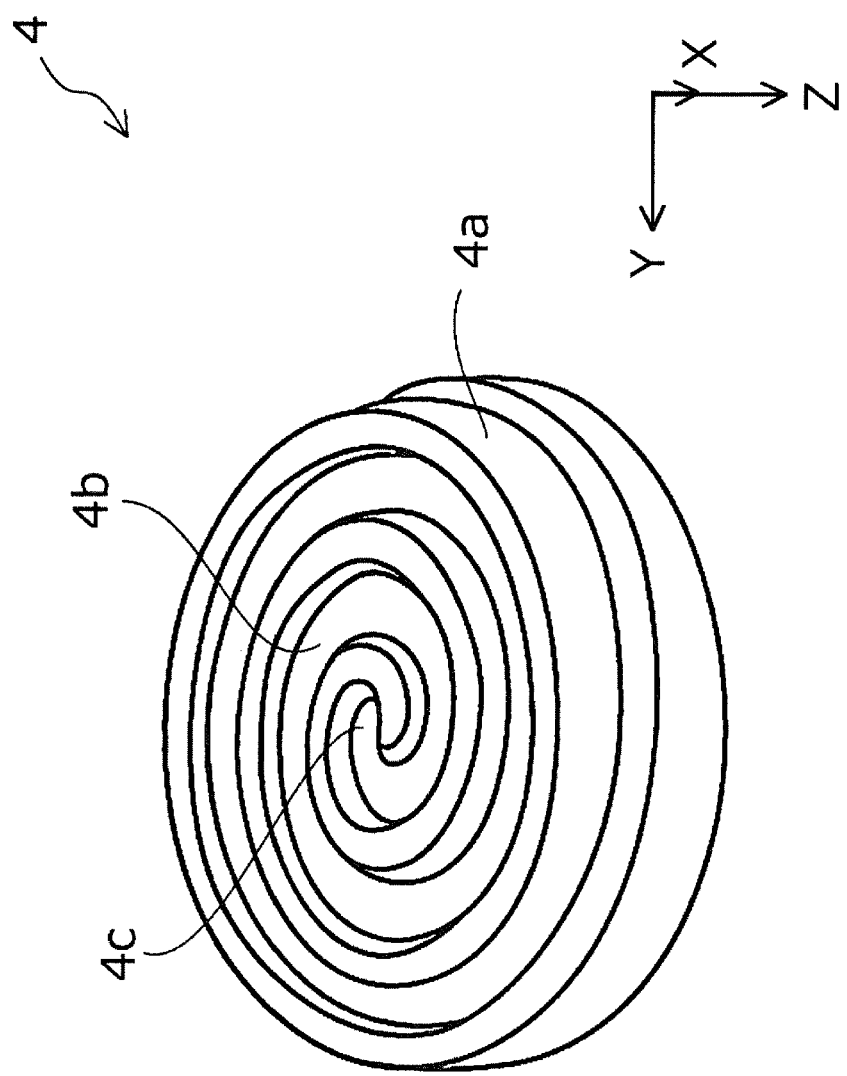
FIG. 2 is a schematic view showing a flat screw of the metal shaped article production apparatus according to one embodiment of the present disclosure.
Figure 3:
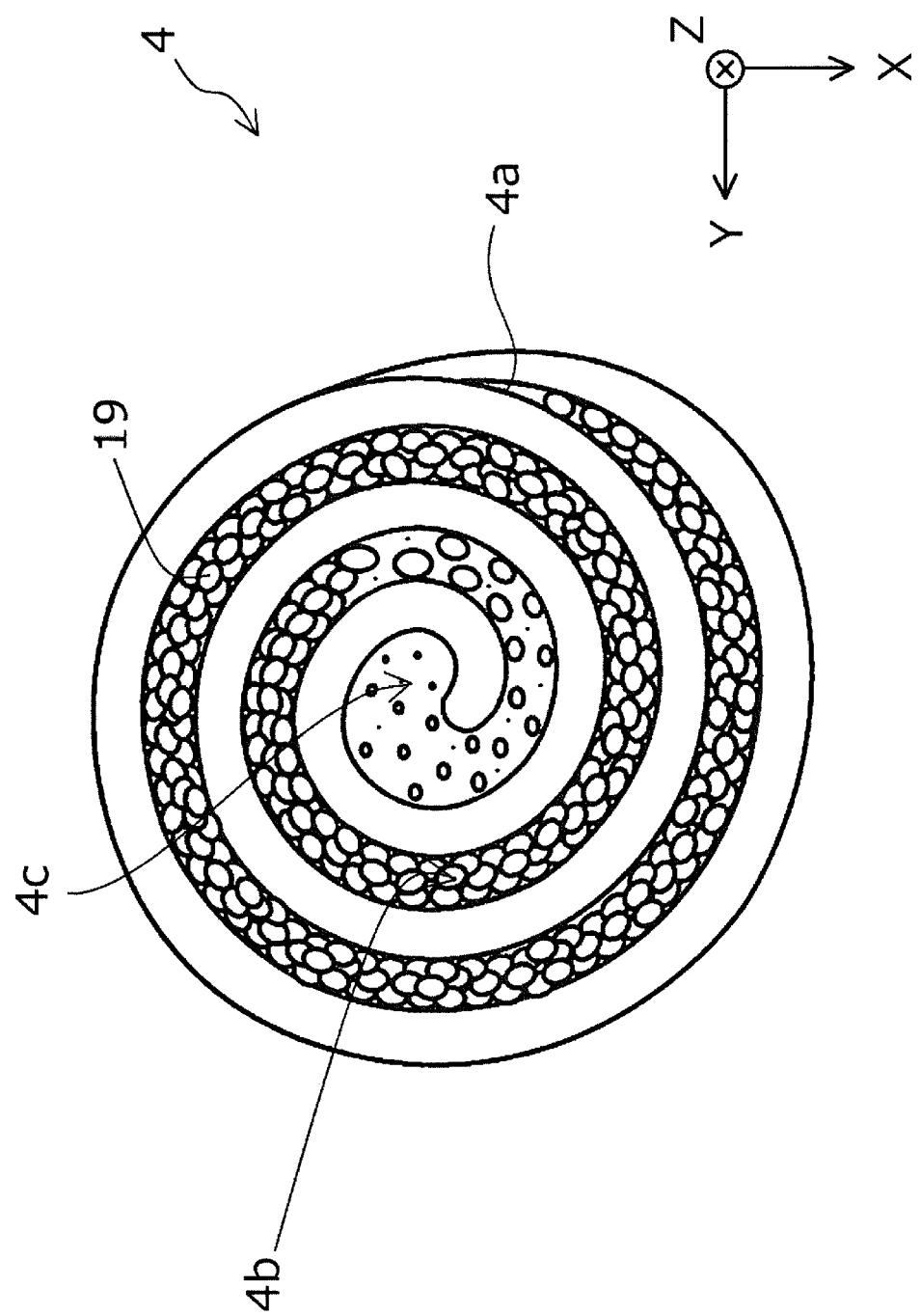
FIG. 3 is a schematic view showing a state where a first material is filled in the flat screw of the metal shaped article production apparatus according to one embodiment of the present disclosure.

As shown in FIG. 2, a notch 4b with a helical shape is formed from the circumferential face 4a to a central portion 4c on a bottom face of the flat screw 4. Therefore, by rotating the flat screw 4 with a direction along the Z direction as the axis of rotation by a motor 6 shown in FIG. 1, the pellets 19 are sent from the circumferential face 4a to a central portion 4c as shown in FIG. 3.

As shown in FIG. 1, a barrel 5 is provided at a position opposed to the bottom face of the flat screw 4. In the vicinity of the upper face of the barrel 5, a heater 7 and a heater 8 are provided. Since the flat screw 4 and the barrel 5 have such configurations, by rotating the flat screw 4, the pellets 19 move from the circumferential face 4a to the central portion 4c while being supplied to a space portion 20 by the notch 4b formed between the bottom face of the flat screw 4 and the upper face of the barrel 5. When the pellets 19 move in the space portion 20 by the notch 4b, the pellets 19 are melted by heat of the heater 7 and the heater 8, and also pressurized by a pressure caused by the movement in the narrow space portion 20.

Figure 4:
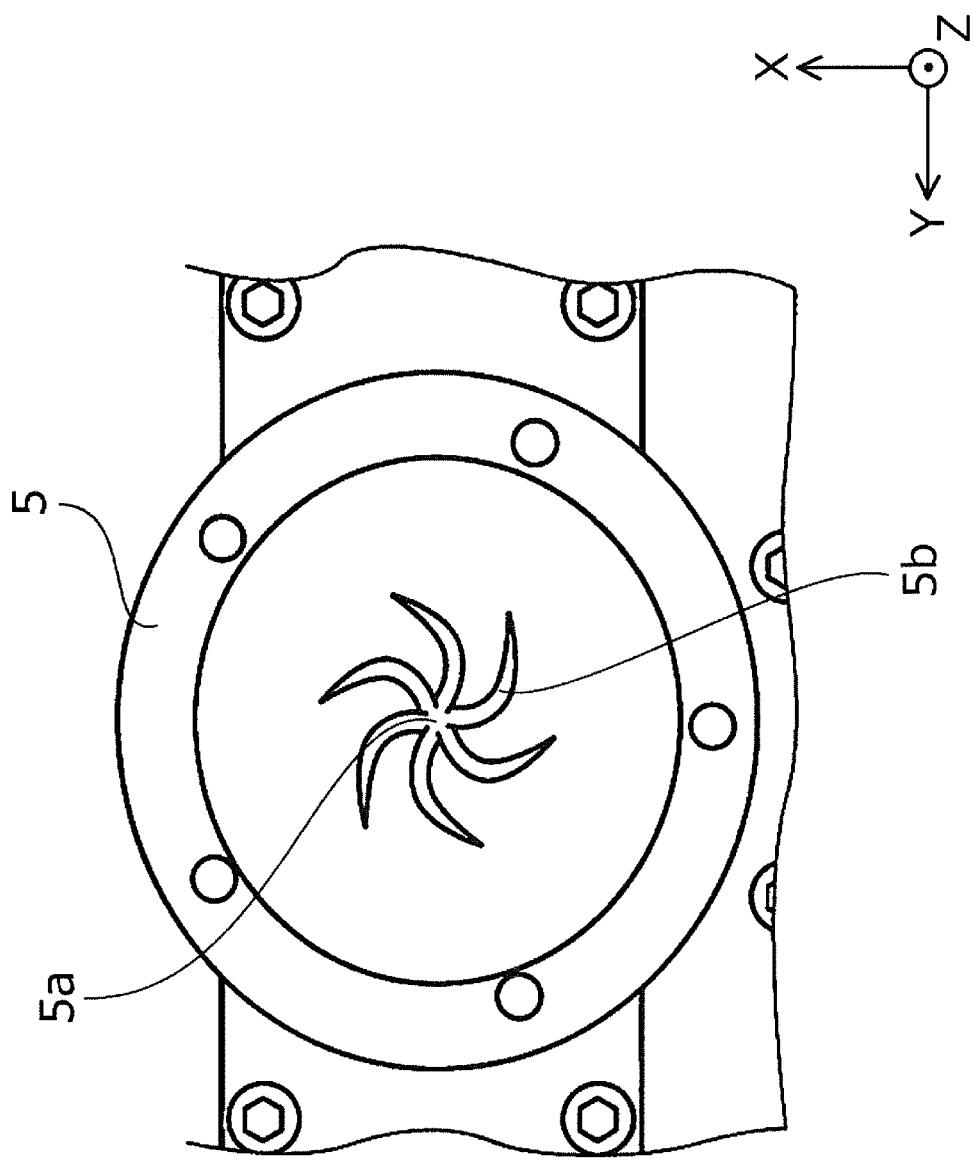
FIG. 4 is a schematic view showing a barrel of the metal shaped article production apparatus according to one embodiment of the present disclosure.

As shown in FIGS. 1 and 4, in the central portion of the barrel 5 in plan view, a moving path 5a for the constituent material being the melted pellet 19 is formed. As shown in FIG. 1, the moving path 5a is coupled to a nozzle 10a of an injection section 10 injecting the constituent material. As shown in FIG. 4, on the upper face of the barrel 5, a plurality of grooves 5b coupled to the moving path 5a are formed, and a first material is easily gathered to the moving path 5a.

The injection section 10 is configured to be able to continuously inject the constituent material in a fluid state from the nozzle 10a. As shown in FIG. 1, the injection section 10 is provided with a heater 9 for making the constituent material have a desired viscosity. The constituent material to be injected from the injection section 10 is injected in a linear shape. By injecting the constituent material in a linear shape from the injection section 10, a constituent material layer is formed.

In the metal shaped article production apparatus 1 of this embodiment, an injection unit 21 is formed by the hopper 2, the supply tube 3, the flat screw 4, the barrel 5, the motor 6, the injection section 10, and the like. The metal shaped article production apparatus 1 of this embodiment also includes an injection unit 21 injecting a support material (not shown in FIG. 1) in addition to the injection unit 21 injecting the constituent material. The support material is a material for forming a support material layer for supporting the constituent material layer, and is a pellet containing ceramic particles and a thermoplastic resin. However, the injection unit 21 injecting the support material has the same configuration as the injection unit 21 injecting the constituent material, and therefore, the description thereof is omitted.

Further, as shown in FIG. 1, the metal shaped article production apparatus 1 of this embodiment includes a stage unit 22 for placing the constituent material layer and the support material layer formed by injection from the injection unit 21. The stage unit 22 includes a plate 11 on which the constituent material layer and the support material layer are actually placed. Further, the stage unit 22 includes a first stage 12, on which the plate 11 is placed, and whose position can be changed along the Y direction by driving a first driving section 15. In addition, the stage unit 22 includes a second stage 13, on which the first stage 12 is placed, and whose position can be changed along the X direction by driving a second driving section 16. Then, the stage unit 22 includes a base section 14 that can change the position of the second stage 13 along the Z direction by driving a third driving section 17.

Figure 6:
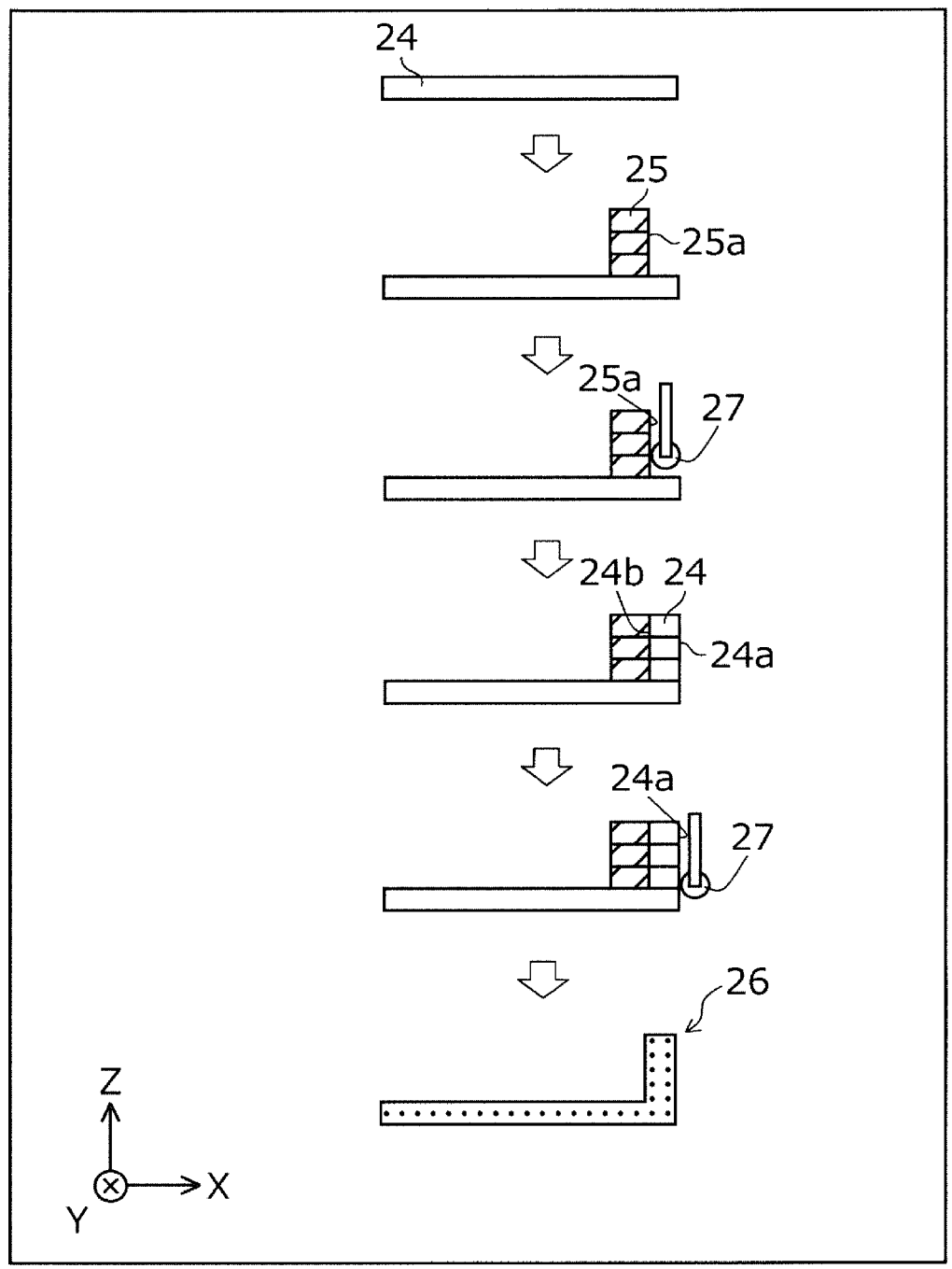
FIG. 6 is a schematic view for illustrating a metal shaped article production process in the metal shaped article production method according to Example 1 of the present disclosure.

Further, as shown in FIG. 1, the metal shaped article production apparatus 1 of this embodiment includes a control section 18 that is electrically coupled to the injection unit 21 and the stage unit 22 and that controls various driving operations of the injection unit 21 and various driving operations of the stage unit 22. Although not shown in FIG. 1, as shown in FIG. 6, the apparatus includes a cutting section 27 driven by control of the control section 18.

Next, a metal shaped article production method performed using the metal shaped article production apparatus 1 of this embodiment will be described.

Example 1

First, a metal shaped article production method of Example 1 will be described using the flowchart in FIG. 5 and FIG. 6. The metal shaped article production method of this Example was performed using the metal shaped article production apparatus 1 and a thermostat bath (not shown). By performing the metal shaped article production method of this Example, a sintered body 26 shown in the bottommost view of FIG. 6 was produced.

Figure 5:
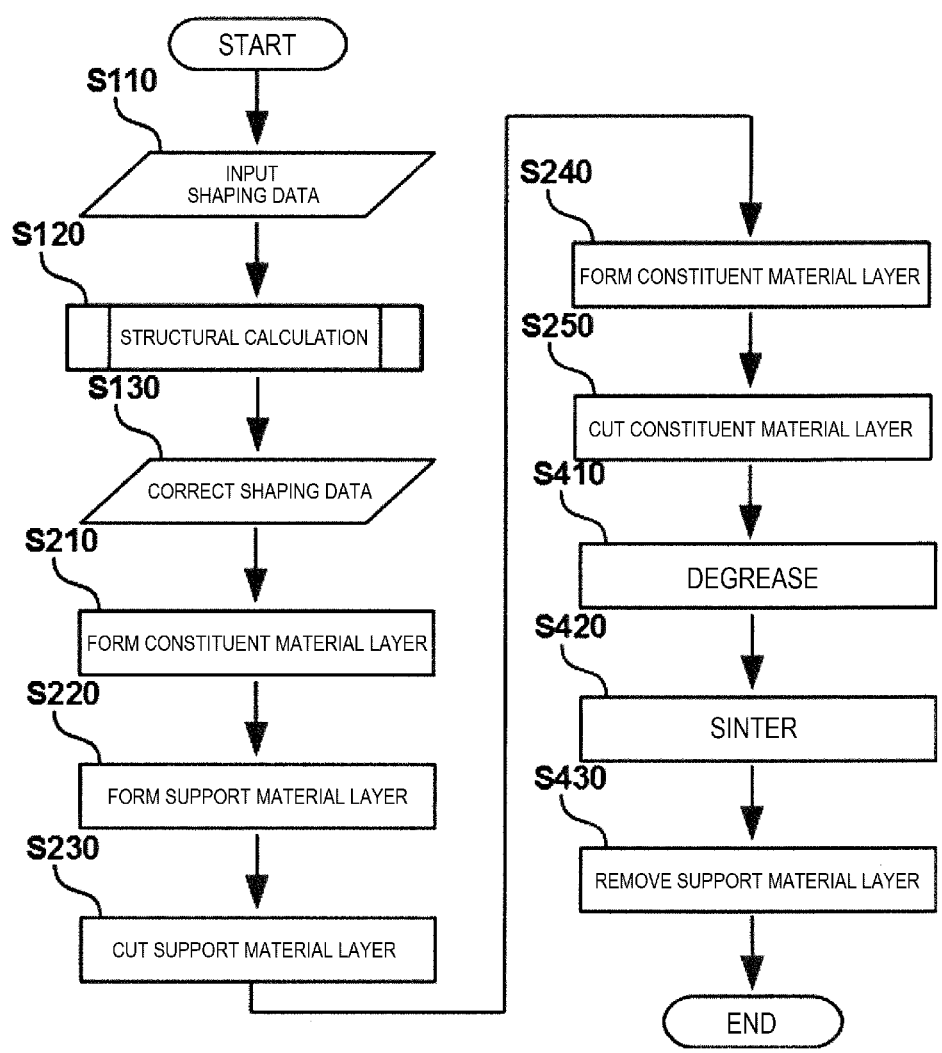
FIG. 5 is a flowchart of a metal shaped article production method according to Example 1 of the present disclosure.

In the metal shaped article production method of this Example, first, as shown in the flowchart in FIG. 5, shaping data of a metal shaped article to be produced is input in Step S110. An input source of the shaping data of the metal shaped article is not particularly limited, however, the shaping data can be input to the metal shaped article production apparatus 1 using a PC or the like.

Subsequently, in Step S120, based on the shaping data input in Step S110, structural calculation of the metal shaped article to be produced is performed. By the structural calculation, a position assumed to be deformed by cutting the constituent material layer 24 when there is no support by the support material layer 25 is determined.

Subsequently, in Step S130, based on the structural calculation in Step S120, the shaping data is corrected so that the support material layer 25 is formed at the position assumed to be deformed by cutting the constituent material layer 24 when there is no support by the support material layer 25. That is, by performing Step S130, the shaping data is corrected so that the support material layer 25 is formed not only at a position for maintaining the shape of the constituent material layer 24, for example, an overhang portion or the like, but also at a position assumed to be deformed by cutting the constituent material layer 24.

Subsequently, in Step S210, as shown in the uppermost view of FIG. 6, the constituent material layer 24 as a first layer is formed by injecting the constituent material from the injection section 10 based on the shaping data corrected in Step S130. In this Example, the sintered body 26 shown in the bottommost view of FIG. 6 is produced, and therefore, the constituent material layer 24 is formed in this step prior to the formation of the support material layer 25, however, the support material layer 25 may be formed prior to the formation of the constituent material layer 24 depending on the shape or the like of the sintered body 26 to be shaped.

Subsequently, in Step S220, as shown in the second view from the top of FIG. 6, the support material layers 25 from a second layer to a fourth layer are formed by injecting the support material from the injection section 10 based on the shaping data corrected in Step S130.

Subsequently, in Step S230, as shown in the third view from the top of FIG. 6, side faces 25a of the support material layers 25 from the second layer to the fourth layer are cut using the cutting section 27.

Subsequently, in Step S240, as shown in the fourth view from the top of FIG. 6, the constituent material layers 24 from a second layer to a fourth layer are formed by injecting the constituent material from the injection section 10. By cutting the side faces 25a of the support material layers 25 in Step S230 before performing this step, the shape of the side faces 24b of the constituent material layers 24 to be formed adjacent to the side faces 25a can be adjusted. This is because by disposing the constituent material layers 24 so as to follow the support material layers 25, the shape of the side faces 24b of the constituent material layers 24 follows the shape of the side faces 25a of the support material layers 25. Accordingly, an excellent surface quality can be obtained.

Subsequently, in Step S250, as shown in the fifth view from the top of FIG. 6, the side faces 24a of the constituent material layers 24 from the second layer to the fourth layer are cut using the cutting section 27.

Then, a stacked body obtained by cutting the side faces 24a of the constituent material layers 24 in Step S250 is transferred to the thermostat bath, and degreased in Step S410, and thereafter sintered in the thermostat bath in Step S420. Then, the stacked body is taken out from the thermostat bath, and further, the support material layers 25 of the stacked body are removed in Step S430, thereby forming the sintered body 26 being a completed body of the metal shaped article as shown in the bottommost view of FIG. 6, and thus, the metal shaped article production method of this Example is completed.

As described above, the metal shaped article production method of this Example is a metal shaped article production method for producing a metal shaped article based on shaping data. Then, the method includes a shaping data input step corresponding to Step S110. Further, the method includes a constituent material layer forming step that corresponds to Step S210 and Step S240 and that forms the constituent material layer 24 using the constituent material containing metal particles constituting the metal shaped article and a thermoplastic resin. Further, the method includes a support material layer forming step that corresponds to Step S220 and that forms the support material layer 25 supporting the constituent material layer 24 using the support material containing ceramic particles and a thermoplastic resin. Further, the method includes a cut face cutting step that corresponds to Step S250 and that cuts the side face 24a being a cut face in the constituent material layer 24 of the stacked body formed by performing the constituent material layer forming step and the support material layer forming step. Further, the method includes a degreasing step that corresponds to Step S410 and that degreases the thermoplastic resin contained in the stacked body for which the cut face cutting step was performed. Further, the method includes a sintering step that corresponds to Step S420 and that sinters the metal particles by heating the stacked body. Here, as described above, in the support material layer forming step, based on the shaping data that is the shaping data input in Step S110 and that was corrected in Step S130, the support material layer 25 is formed so that the side face 25a being a support face comes into contact with the side face 24b being a face to be supported at the opposite side to the side face 24a at a position of the constituent material layer 24 assumed to be deformed by performing the cut face cutting step when there is no support by the support material layer 25.

In this manner, in the metal shaped article production method of this Example, cutting of the side face 24a being a cut face is performed before degreasing and sintering, however, the position of the constituent material layer 24 assumed to be deformed accompanying cutting of the cut face when there is no support by the support material layer 25 is in a state of being supported by the support material layer 25. Therefore, the metal shaped article production method of this Example can suppress deformation of the metal shaped article accompanying cutting of the cut face. The execution order of the constituent material layer forming step and the support material layer forming step may be changed depending on the shape of the metal shaped article to be produced, the position where cutting is performed, or the like without being particularly limited.

Further, in the metal shaped article production method of this Example, the constituent material layer forming step of Step S240 is performed after performing the support material layer forming step of Step S220, and the support material cutting step of Step S230 of cutting the side face 25a being a support face of the support material layer 25 supporting the side face 24b being a face to be supported in the constituent material layer 24 is performed after performing the support material layer forming step of Step S220 and before performing the constituent material layer forming step of Step S240.

In this manner, in the metal shaped article production method of this Example, the shape is adjusted by cutting the side face 25a being a support face of the support material layer 25 after forming the support material layer 25 and before forming the constituent material layer 24. Therefore, the metal shaped article production method of this Example can highly accurately form the side face 24b being a face to be supported of the constituent material layer 24 to be supported by the side face 25a.

Example 2

Next, a metal shaped article production method of Example 2 will be described using the flowchart in FIG. 7 and FIG. 8. The metal shaped article production method of this Example was performed using the above-mentioned metal shaped article production apparatus 1 and a thermostat bath (not shown) in the same manner as the metal shaped article production method of Example 1. By performing the metal shaped article production method of this Example, a sintered body 26 shown in the bottommost view of FIG. 8 was produced.

Figure 7:
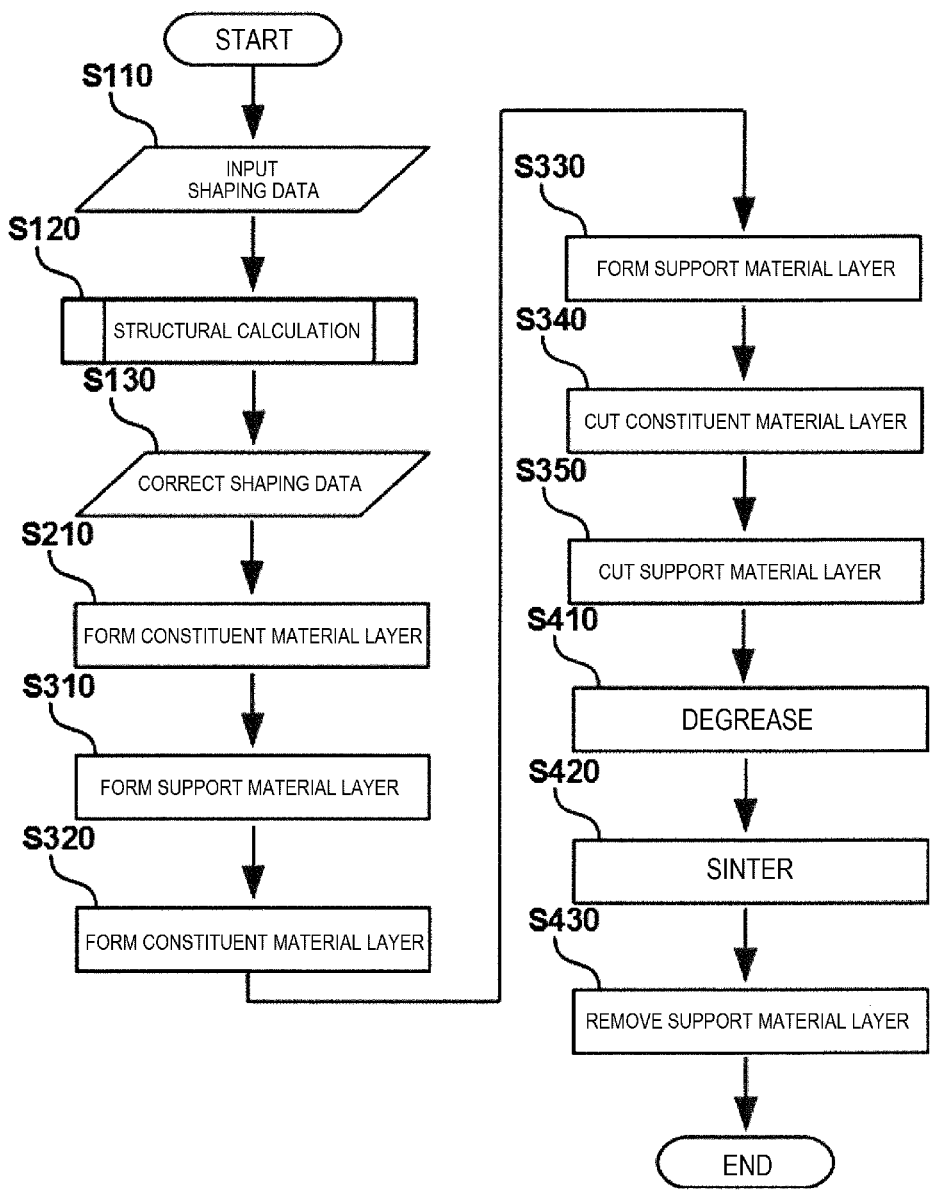
FIG. 7 is a flowchart of a metal shaped article production method according to Example 2 of the present disclosure.

In the metal shaped article production method of this Example, first, as shown in the flowchart in FIG. 7, steps from Step S110 to Step S210 are performed in the same manner as the metal shaped article production method of Example 1. The steps from Step S110 to Step S210 are the same as in the metal shaped article production method of Example 1, and therefore, the detailed description thereof is omitted.

After completion of Step S210, in Step S310, the support material layers 25 from a second layer to a fourth layer are formed by injecting the support material from the injection section 10 based on the shaping data corrected in Step S130. Then, in Step S320, the constituent material layers 24 from a second layer to a fourth layer are formed by injecting the constituent material from the injection section 10 based on the shaping data corrected in Step S130. The second view from the top of FIG. 8 shows a state immediately after performing Step S310 and Step S320.

Subsequently, in Step S330, as shown in the third view from the top of FIG. 8, the support material layer 25 as a fifth layer is formed by injecting the support material from the injection section 10. The support material layer 25 as the fifth layer is formed over the upper portion of the upper face 24c of the constituent material layer 24 as the fourth layer.

Subsequently, in Step S340, as shown in the fourth view from the top of FIG. 8, the side faces 24a of the constituent material layers 24 from the second layer to the fourth layer are cut using the cutting section 27. In general, when the side faces 24a are cut, the upper face 24c at a position near to the side faces 24a is sometimes deformed, however, in the metal shaped article production method of this Example, the upper face 24c is supported by the support material layer 25 as the fifth layer, and therefore, deformation of the upper face 24c accompanying cutting of the side faces 24a is suppressed.

Subsequently, in Step S350, as shown in the fifth view from the top of FIG. 8, the support material layer 25 as the fifth layer is removed by cutting using the cutting section 27, and also the support material layers 25 from the second layer to the fourth layer are thinned by cutting at the opposite side to the side faces 25a of the support material layers 25 from the second layer to the fourth layer. By removing the support material layer 25 as the fifth layer and also thinning the support material layers 25 from the second layer to the fourth layer, inhibition of removal of the thermoplastic resin or the like of the constituent material layer 24 by the support material layer 25 or requirement of much time for degreasing in the degreasing step to be performed later is suppressed. In Step S350, as the support material layer 25 as the fifth layer is cut, the shape of the upper face 24c of the constituent material layer 24 is also adjusted by the cutting.

Subsequently, the process proceeds to Step S410, and as shown in the flowchart in FIG. 7, steps from Step S410 to Step S430 are performed in the same manner as the metal shaped article production method of Example 1. The steps from Step S410 to Step S430 are the same as in the metal shaped article production method of Example 1, and therefore, the detailed description thereof is omitted.

As described above, also the metal shaped article production method of this Example is a metal shaped article production method for producing a metal shaped article based on shaping data in the same manner as the metal shaped article production method of Example 1. Then, the method includes a shaping data input step corresponding to Step S110. Further, the method includes a constituent material layer forming step that corresponds to Step S210 and Step S320 and that forms the constituent material layer 24 using the constituent material containing metal particles constituting the metal shaped article and a thermoplastic resin. Further, the method includes a support material layer forming step that corresponds to Step S310 and Step S330 and that forms the support material layer 25 supporting the constituent material layer 24 using the support material containing ceramic particles and a thermoplastic resin. Further, the method includes a cut face cutting step that corresponds to Step S340 and that cuts the side face 24a being a cut face in the constituent material layer 24 of the stacked body formed by performing the constituent material layer forming step and the support material layer forming step. Further, the method includes a degreasing step that corresponds to Step S410 and that degreases the thermoplastic resin contained in the stacked body for which the cut face cutting step was performed. Further, the method includes a sintering step that corresponds to Step S420 and that sinters the metal particles by heating the stacked body. Here, also in the metal shaped article production method of this Example, in the same manner as the metal shaped article production method of Example 1, in the support material layer forming step, based on the shaping data that is the shaping data input in Step S110 and that was corrected in Step S130, the support material layer 25 is formed so that the side face 25a being a support face comes into contact with the side face 24b being a face to be supported at the opposite side to the side face 24a at a position of the constituent material layer 24 assumed to be deformed by performing the cut face cutting step when there is no support by the support material layer 25.

In this manner, also in the metal shaped article production method of this Example, in the same manner as the metal shaped article production method of Example 1, cutting of the side face 24a being a cut face is performed before degreasing and sintering, however, the position of the constituent material layer 24 assumed to be deformed accompanying cutting of the cut face when there is no support by the support material layer 25 is in a state of being supported by the support material layer 25. Therefore, also the metal shaped article production method of this Example can suppress deformation of the metal shaped article accompanying cutting of the cut face in the same manner as the metal shaped article production method of Example 1. The execution order of the constituent material layer forming step and the support material layer forming step may be changed depending on the shape of the metal shaped article to be produced, the position where cutting is performed, or the like without being particularly limited.

Figure 8:
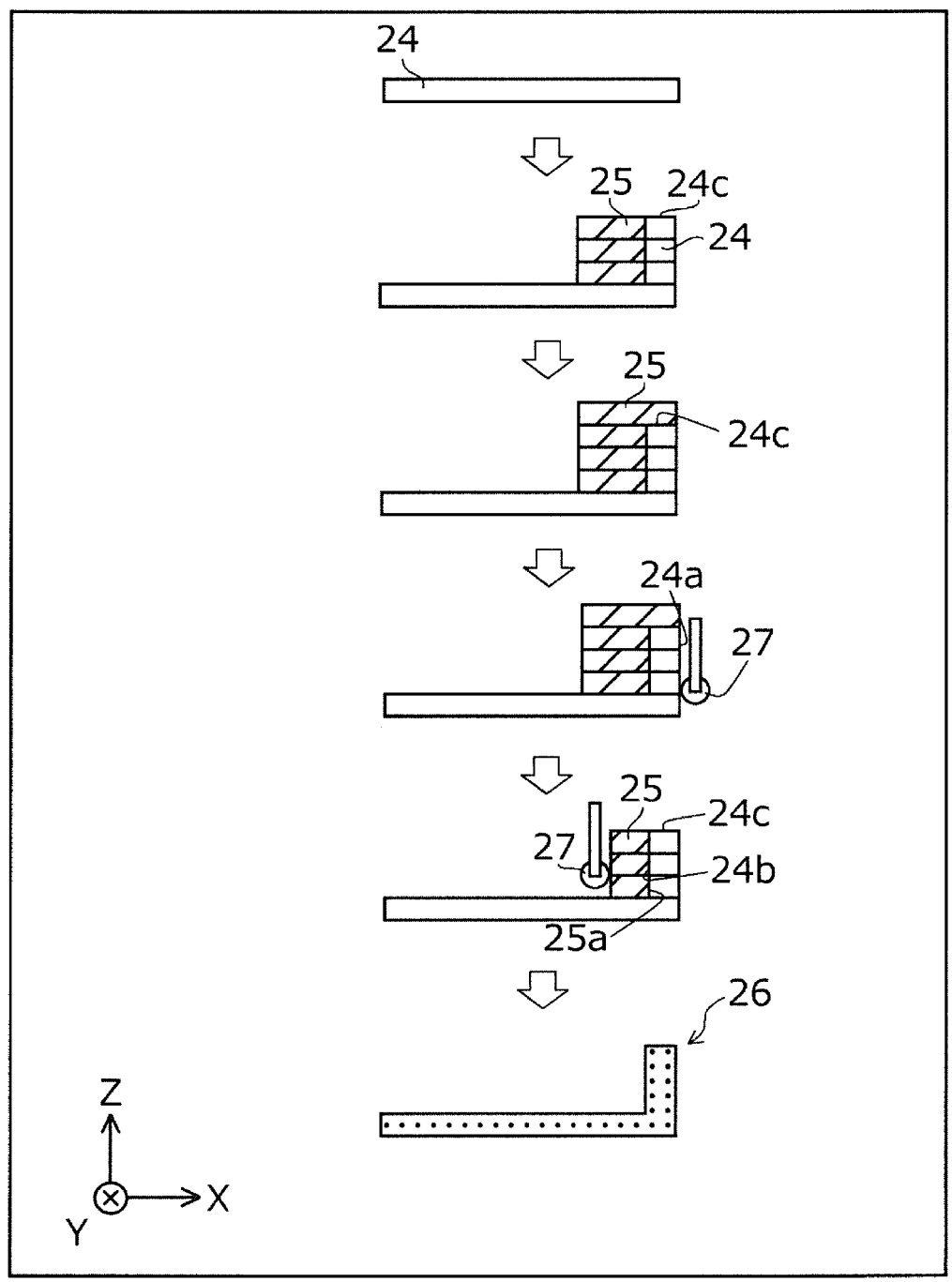
FIG. 8 is a schematic view for illustrating a metal shaped article production process in the metal shaped article production method according to Example 2 of the present disclosure.

Further, the side face 24a being a cut face and the side face 24b being a face to be supported face the X direction crossing the Z direction being a stacking direction of the stacked body as shown in FIG. 8. Then, in the metal shaped article production method of this Example, in the support material layer forming step, the support material layer 25 is also formed at a position supporting the upper face 24c being a stacking direction face facing the stacking direction in the constituent material layer 24 in addition to a position supporting the side face 24b being a face to be supported.

In this manner, in the metal shaped article production method of this Example, the support material layer 25 is also formed at a position supporting the upper face 24c being a stacking direction face in addition to a position supporting the side face 24b being a face to be supported. Therefore, as described above, not only deformation of the constituent material layer 24 at the face to be supported side accompanying cutting of the side face 24a being a cut face can be suppressed, but also deformation of the constituent material layer 24 at the stacking direction face side can be suppressed.

Further, Step S350 in the metal shaped article production method of this Example includes a removing step of removing the support material layer 25 supporting the upper face 24c in the stacked body for which the cut face cutting step of Step S340 was performed. Further, as described above, the method includes a stacking direction face cutting step of cutting the upper face 24c in the stacked body for which the removing step was performed, thereby adjusting the shape. Then, the degreasing step of Step S410 is performed after performing the stacking direction face cutting step.

In this manner, in the metal shaped article production method of this Example, not only the side face 24a being a cut face of the constituent material layer 24, but also the upper face 24c being a stacking direction face is cut, and therefore, not only the cut face, but also the stacking direction face can be highly accurately formed.

Further, as described above, in the metal shaped article production method of this Example, in Step S350, a thickness adjusting step of adjusting the thickness of the support material layer 25 in the X direction crossing the side face 24a being a support face by cutting the support material layer 25 is performed before performing the degreasing step of Step S410.

It takes a long time to perform degreasing when the thick support material layer 25 is in contact with the constituent material layer 24, however, in the metal shaped article production method of this Example, the thickness of the support material layer 25 in the X direction crossing the support face is adjusted by cutting the support material layer 25 before performing degreasing, and therefore, the degreasing time can be reduced.

The present disclosure is not limited to the above-mentioned Examples, but can be realized in various configurations without departing from the gist of the present disclosure. The technical features in the Examples corresponding to the technical features in the respective forms described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A metal shaped article production method for producing a metal shaped article based on shaping data, comprising:
    a shaping data input step of inputting the shaping data;
    a constituent material layer forming step of forming a constituent material layer using a constituent material containing metal particles constituting the metal shaped article and a thermoplastic resin;
    a support material layer forming step of forming a support material layer supporting the constituent material layer using a support material containing ceramic particles and a thermoplastic resin;
    a cut face cutting step of cutting a cut face in the constituent material layer of a stacked body formed by performing the constituent material layer forming step and the support material layer forming step;

a degreasing step of degreasing the thermoplastic resin contained in the stacked body after performing the cut face cutting step; and a sintering step of sintering the metal particles by heating the stacked body, wherein in the support material layer forming step, the support material layer is formed so that a support face contacts with a face to be supported at an opposite side to the cut face at a position assumed to be deformed by cutting the constituent material layer based on the shaping data.

2. The metal shaped article production method according to claim 1, wherein the constituent material layer forming step is performed after performing the support material layer forming step, and a support material cutting step of cutting the support face supporting the face to be supported is performed after performing the support material layer forming step and before performing the constituent material layer forming step.

3. The metal shaped article production method according to claim 1, wherein the cut face and the face to be supported face a direction crossing a stacking direction of the stacked body, and in the support material layer forming step, the support material layer is also formed at a position supporting a stacking direction face facing the stacking direction in the constituent material layer in addition to a position supporting the face to be supported.

4. The metal shaped article production method according to claim 3, further comprising:

a removing step of removing the support material layer supporting the stacking direction face in the stacked body after performing the cut face cutting step; and a stacking direction face cutting step of cutting the stacking direction face in the stacked body after performing the removing step, wherein the degreasing step is performed after performing the stacking direction face cutting step.

5. The metal shaped article production method according to claim 1, wherein a thickness adjusting step of adjusting a thickness of the support material layer in a direction crossing the support face by cutting the support material layer is performed before performing the degreasing step.

* * * * *